United States Patent
Oh et al.

(10) Patent No.: US 8,893,869 B2
(45) Date of Patent: Nov. 25, 2014

(54) CLUTCH ACTUATOR FOR VEHICLES

(71) Applicant: Hyundai Motor Company, Seoul (KR)

(72) Inventors: Wan Soo Oh, Yongin-si (KR); Jae Woong Hwang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 85 days.

(21) Appl. No.: 13/791,326

(22) Filed: Mar. 8, 2013

(65) Prior Publication Data

US 2014/0138207 A1   May 22, 2014

(30) Foreign Application Priority Data

Nov. 20, 2012   (KR) .................. 10-2012-0131473

(51) Int. Cl.
*F16D 28/00*   (2006.01)
*F16D 23/12*   (2006.01)

(52) U.S. Cl.
CPC ...................... *F16D 23/12* (2013.01)
USPC ....... 192/48.2; 192/48.8; 192/84.6; 192/93 B; 192/99 S

(58) Field of Classification Search
CPC .................... F16D 2021/063; F16D 2023/123; F16D 2023/126
USPC .................. 192/48.2, 84.6, 84.7, 93 B, 99 S
See application file for complete search history.

(56) References Cited

U.S. PATENT DOCUMENTS

| 8,381,889 | B2 * | 2/2013 | Burkhart | 192/48.607 |
| 2009/0000900 | A1 * | 1/2009 | Becht | 192/70.252 |
| 2010/0108456 | A1 * | 5/2010 | Gerundt et al. | 192/48.2 |

FOREIGN PATENT DOCUMENTS

KR   1020080020232 A   3/2008

* cited by examiner

*Primary Examiner* — Richard M. Lorence
(74) *Attorney, Agent, or Firm* — Morgan, Lewis & Bockius LLP

(57) ABSTRACT

A clutch actuator for vehicles may include a lever lift engaged to a power generation unit so that the lever lift may be linearly moved by power generated from the power generation unit, wherein the lever lift includes an inclined surface provided on each of first and second ends thereof, and a lever provided between the lever lift and an actuating member that operates a diaphragm spring, wherein the lever includes lift protrusions formed at positions corresponding to respective inclined surfaces and contacting thereto, and wherein the lever may be configured such that when the lever lift linearly moves in a predetermined direction, the lift protrusions move along corresponding inclined surfaces, so that opposite ends of the lever pivotally rotate, whereby one of the opposite ends of the lever moves towards the actuating member.

8 Claims, 5 Drawing Sheets

CLUTCH ACTUATOR FOR VEHICLES

CROSS-REFERENCE TO RELATED APPLICATION

The present application claims priority to Korean Patent Application No. 10-2012-0131473, filed on Nov. 20, 2012, the entire contents of which is incorporated herein for all purposes by this reference.

BACKGROUND OF THE INVENTION

1. Field of the Invention

The present invention relates generally to clutch actuators and, more particularly, to a clutch actuator for a vehicle which is configured such that a motor having a small capacity can be used to operate a diaphragm spring having a comparatively large load, thus improving the fuel efficiency of the vehicle.

2. Description of Related Art

These days, automobile manufacturers are in intense competition as they strive to make technical developments and improvements in vehicle fuel efficiency from various angles; for example, developments pertaining to hybrid or electric vehicles, automation of manual transmissions, etc. Particularly, more so than hybrid or electric vehicles, research into automated manual transmissions is being competitively conducted, as these are competitively priced, provide a shift feeling of a similar level to that of typical hydraulic controlled automatic transmissions, and are improved in fuel efficiency by 6% to 8%.

Automated manual transmissions use the manual gearshift mechanism of the existing manual transmission, but the operation of a clutch and gear shifting are controlled by an actuator rather than by manual handling, unlike the gearshift mechanism of the manual transmission.

FIG. 1 is a view showing the structure of a clutch actuator of a conventional automated manual transmission. A motor 1 which generates drive force for the actuator is connected to a push rod 3 through a reducer 2. A release fork 4 is operated in a seesaw manner by a linear motion of the push rod 3, thus operating a release bearing 5.

However, a load required to operate the release bearing 5 is sharply increased, as a stroke to which the release bearing is moved is increased. Thus, to overcome the operation load and operate the release bearing, the load of the motor must be increased. Therefore, when the clutch is operated, the motor uses a lot of electric current, thus reducing the effect of improving the fuel efficiency of a vehicle.

Furthermore, because the structure and operation mechanism for operating the release bearing are complex, the size of the actuator is increased, and the production cost thereof is also increased. In addition, the conventional clutch actuator is disadvantageous in that noise and vibrations are caused.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch actuator for vehicles which is configured such that a motor having a small capacity can be used to operate a diaphragm spring having a comparatively large load, thus improving the fuel efficiency of the vehicle and providing a clutch actuator for vehicles in which the mechanism for operating a diaphragm spring is embodied by a simple operation mechanism that uses inclined surfaces, thus making it possible to reduce the size and weight of the clutch actuator.

In an aspect of the present invention, a clutch actuator apparatus for vehicles may include a lever lift engaged to a power generation unit so that the lever lift is linearly moved by power generated from the power generation unit, wherein the lever lift may include an inclined surface provided on each of first and second ends thereof, and a lever provided between the lever lift and an actuating member that operates a diaphragm spring, wherein the lever may include lift protrusions formed at positions corresponding to respective inclined surfaces and contacting thereto, and wherein the lever is configured such that when the lever lift linearly moves in a predetermined direction, the lift protrusions move along corresponding inclined surfaces, so that opposite ends of the lever pivotally rotate, whereby one of the opposite ends of the lever moves towards the actuating member.

A worm wheel is coupled to the power generation unit so that the worm wheel is rotated by rotational force of the power generation unit, wherein a worm is formed in the lever lift and engaged with the worm wheel, and wherein a rotating motion of the worm wheel generated by the power generation unit is converted into a linear motion of the worm, thus linearly moving the lever lift.

The power generation unit may include a motor.

The inclined surfaces provided on the first and second ends of the lever lift are inclined in directions opposite to each other and the lift protrusions move along the corresponding inclined surfaces.

An elastic member is provided on an end of the lever that corresponds to the second end of the lever lift so that when the lever moves in a direction, the elastic member provides elastic force with which a lift protrusion provided on the end of the lever pushes corresponding inclined surface, thus assisting the lever lift moving linearly.

The actuating member is engaged to an end of the lever that corresponds to the first end of the lever lift.

The elastic member may include a spring.

In another aspect of the present invention, the clutch actuator apparatus may include a plurality of clutch actuator apparatuses provided in a clutch housing, wherein the clutch actuators are individually installed on respective clutches provided in a double clutch.

In a clutch actuator apparatus for vehicles according to the present invention, when a lever lift linearly moves, a lever is moved by the operation mechanism that uses inclined surfaces, whereby an actuating member is operated. Therefore, the structure of the mechanism for operating the lever can be simplified, thus not only reducing the volume and weight of the clutch actuator apparatus but also reducing the production cost.

Moreover, the elastic force of an elastic member is added to the torque of a motor to linearly move the lever lift, thus increasing the force that linearly moves the lever lift. Thereby, a small capacity motor can be used as the motor even though it is needed to operate a comparatively large load of the clutch. As a result, the power consumption of the motor can be reduced, thus improving the fuel efficiency.

Furthermore, using a multiple clutch actuator structure, the present invention can be applied to a double clutch type automated manual transmission. In addition, the clutch actuator is installed in a clutch housing so that the size and volume of the transmission can be reduced, thus enhancing the layout of the clutch actuator.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
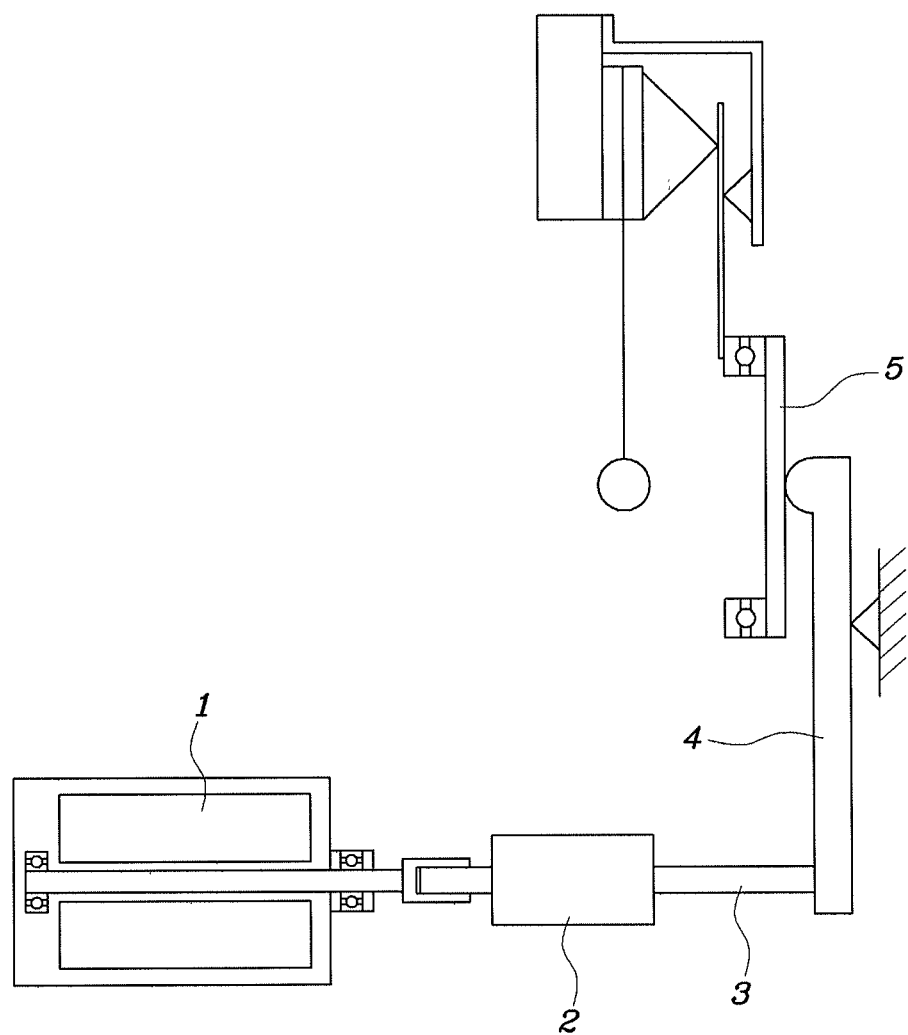
FIG. 1 is a view showing the structure of a conventional clutch actuator.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a preferred embodiment of the present invention will be described in detail with reference to the attached drawings.

Figure 2:
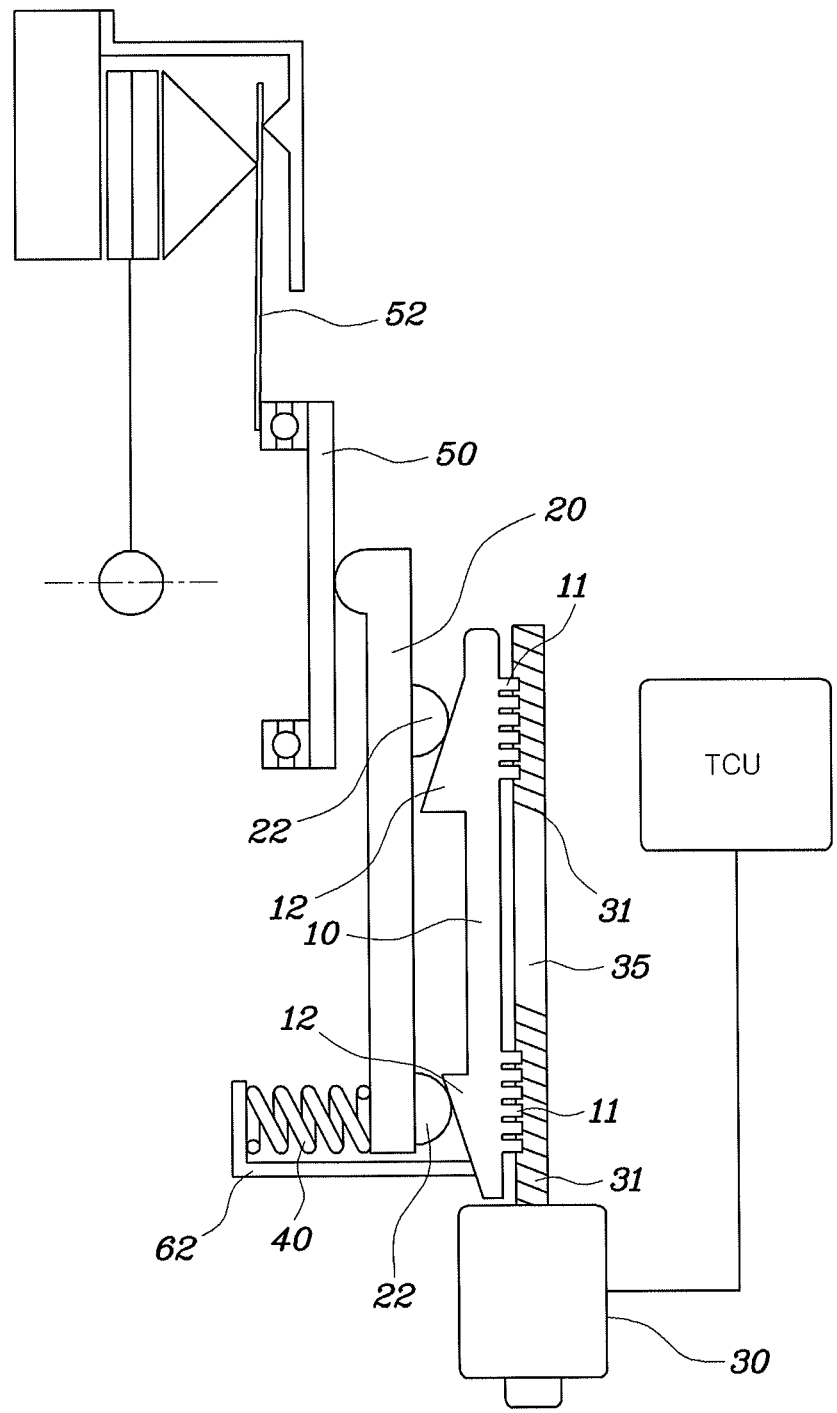
FIG. 2 is a view illustrating the structure of a clutch actuator when it is not in operation, according to an exemplary embodiment of the present invention.
Figure 3:
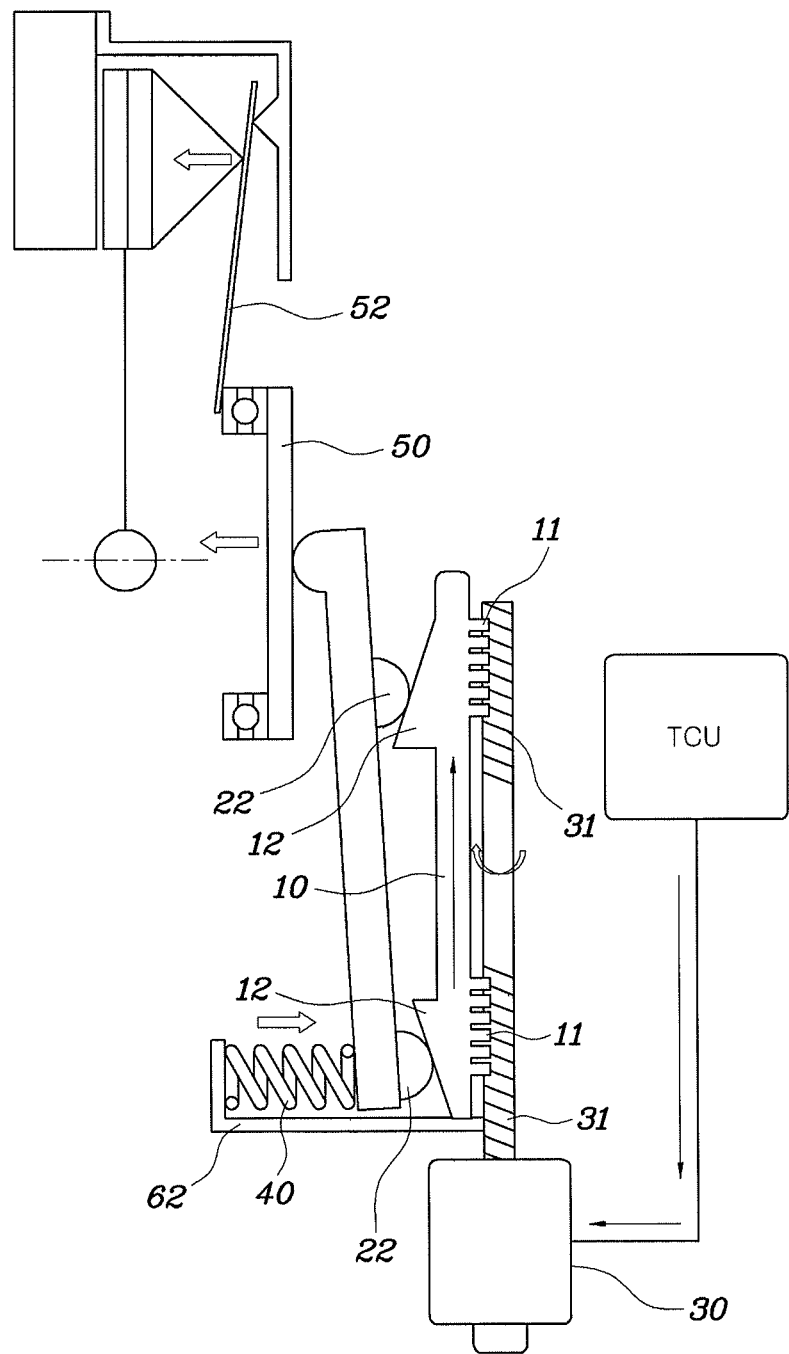
FIG. 3 is a view illustrating the structure of a clutch actuator of FIG. 2 when it is in operation, according to an exemplary embodiment of the present invention.
Figure 4:
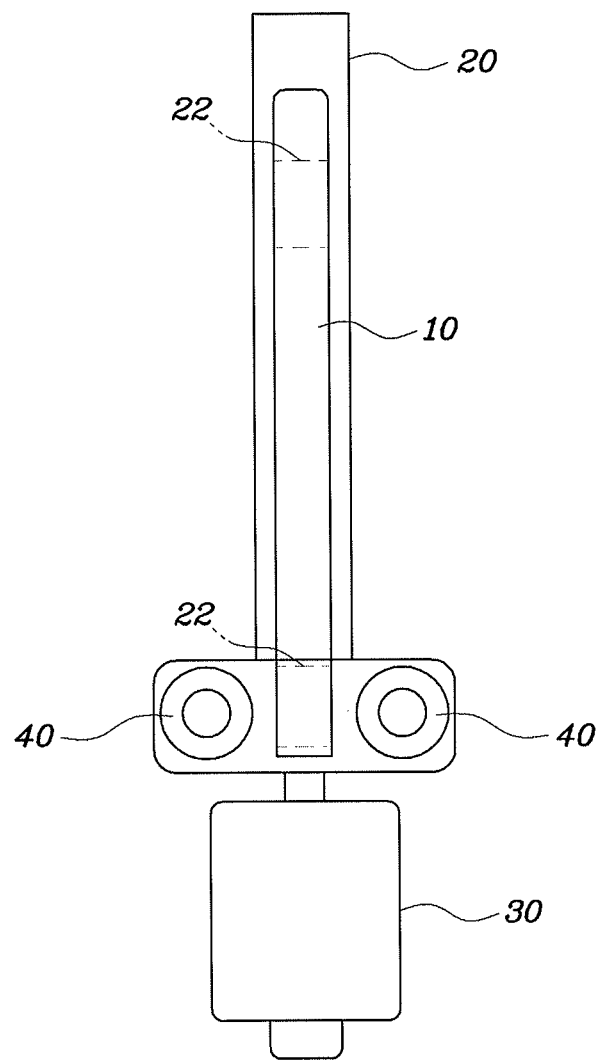
FIG. 4 is a side view of the clutch actuator of FIG. 2.

FIG. 2 is a view illustrating the structure of a clutch actuator when it is not in operation, according to an exemplary embodiment of the present invention. FIG. 3 is a view illustrating the structure of a clutch actuator of FIG. 2 when it is in operation, according to an exemplary embodiment of the present invention. FIG. 4 is a side view of the clutch actuator of FIG. 2.

Referring to FIGS. 2 through 4, a clutch actuator for a vehicle according to an exemplary embodiment of the present invention includes a lever lift 10 and a lever 20.

In detail, the lever lift 10 is connected to a power generation unit so that the lever lift 10 is linearly moved by power generated from the power generation unit. Inclined surfaces 12 are respectively formed on first and second ends of the lever lift 10. The lever 20 is provided between the lever lift 10 and an actuating member 50 which operates a diaphragm spring 52. The lever 20 includes lift protrusions 22 which are disposed at positions corresponding to the respective inclined surfaces 12 and is configured such that when the lever lift 10 linearly moves in a predetermined direction, the lift protrusions 22 move along the corresponding inclined surfaces 12, so that opposite ends of the lever 20 rotate in a seesaw manner, whereby one end of the lever 20 moves towards the actuating member 50.

Additionally, the lever lift 10 is connected to the power generation unit. Thus, the power generation unit provides power to the lever lift 10. The lever lift 10 is linearly moved by the power generation unit. The inclined surfaces 12 protrude from the first and second ends of a first surface of the lever lift 10 towards the lever 20.

The lever 20 is disposed facing the lever lift 10. A first end of the lever 20 is brought into contact with the actuating member 50 that is provided to operate the diaphragm spring 52. The diaphragm spring 52 provides elastic force to push a pressure plate of the clutch or release it so that the clutch enters the engaged state or the released state. The actuating member 50 may include a release bearing or engagement bearing which pushes or pulls the diaphragm spring 52 to make the clutch enter the engaged state or the released state.

Further, the lift protrusions 22 protrude from a first surface of the lever 20 that faces the lever lift 10 at the first and second ends thereof that correspond to the respective inclined surfaces 12. Here, because each lift protrusion 22 comes into contact with the corresponding inclined surface 12, the lift protrusion 22 preferably has a roller or ball structure which can roll on the inclined surface 12 so that the lever lift 10 can smoothly move.

When the lever lift 10 linearly moves in a predetermined direction, the contact state between the inclined surfaces 12 of the lever lift 10 and the lift protrusions 22 is maintained, and the lift protrusions 22 move along the inclined surfaces 12 in directions corresponding to a direction in which the actuating member 50 is operated. Therefore, the first end of the lever lift 10 that makes contact with the actuating member 50 pushes or pulls the actuating member 50 so that the clutch enters the engaged state or released state.

As shown in FIG. 2, in an exemplary embodiment of the present invention, a worm wheel 31 is coupled to the power generation unit so that the worm wheel 31 is rotated by rotating force of the power generation unit. A worm 11 which engages with the worm wheel 31 is provided on a second surface of the lever lift 10 that faces the worm wheel 31. Therefore, rotating motion of the worm wheel 31 which is conducted by the power generation unit is converted into linear motion of the worm 11, thus linearly moving the lever lift 10.

The power generation unit may include a motor 30 which is electrically operated. A TCU (transmission control unit) is electrically connected to the power generation unit. The power generation unit receives from the TCU an electrical signal for automatically controlling the power generation unit.

That is, the worm wheel 31 is provided on the output shaft 35 of the motor 30. Upon the motor 30 being operated the worm wheel 31 is rotated. Because the worm 11 provided on the lever lift 10 engages with the worm wheel 31, the rotating motion of the worm wheel 31 is converted into the linear motion of the lever lift 10.

As such, the motor 30 which is electrically operated is used as a power source for operating the lever 20, thus solving a problem of low fuel efficiency which may be caused in the conventional hydraulic actuator by a hydraulic pressure loss or the like.

Meanwhile, in an exemplary embodiment of the present invention, the inclined surfaces 12 which are respectively provided on the first and second ends of the lever lift 10 are configured such that they are inclined in the directions opposite to each other. Therefore, the lift protrusions 22 which move along the corresponding inclined surfaces 12 can move in directions opposite to each other.

In other words, the inclined surface 12 that is formed on the first end of the lever lift 10 is inclined in a direction opposite to a direction in which the inclined surface 12 that is formed on the second end of the lever lift 10 is inclined.

Referring to FIG. 3, when the lever lift 10 moves upwards, the lift protrusion 22 that is provided on the upper end of the lever 20 moves towards the actuating member 50 along the inclined surface 12 that is provided on the upper end of the lever lift 10. On the other hand, the lift protrusion 22 that is provided on the lower end of the lever 20 moves towards the worm wheel 31 along the inclined surface 12 that is provided on the lower end of the lever lift 10. Thereby, the lever 20 moves in a seesaw manner.

On the contrary, when the lever lift 10 moves downwards, the lift protrusion 22 that is provided on the upper end of the lever 20 returns towards the worm wheel 31 along the inclined surface 12 that is provided on the upper end of the lever lift 10. The lift protrusion 22 that is provided on the lower end of the lever 20 returns towards the actuating member 50 along the inclined surface 12 that is provided on the lower end of the lever lift 10.

In an exemplary embodiment of the present invention, an elastic member 40 is provided on the second end of the lever 20 in a state in which the elastic member 40 is elastically compressed. Thus, when the lever 20 moves upwards, the elastic member 40 provides elastic force with which the lift protrusion 22 that is provided on the second end of the lever 20 pushes the corresponding inclined surface 12, thus assisting the lever lift 10 moving linearly.

In other words, a first end of the elastic member 40 supports the second end of the lever 20, and a second end thereof is supported on a clutch housing 60 or by a separate bracket 62 that is fixed to the clutch housing 60.

Therefore, when the second end of the lever 20 moves towards the worm wheel 31, the elastic member 40 provides force, with which the lift protrusion 22 that is provided on the second end of the lever 20 pushes the corresponding inclined surface 12 of the lever lift 10. Then, the lift protrusion 22 makes contact with the corresponding inclined surface 12, and the elastic force of the elastic member 40 is applied to the lever lift 10 so that the lever lift 10 can be more easily pushed and moved linearly (upwards based on the drawing).

As such, the elastic force of the elastic member 40 is added to the torque of the motor 30 to linearly move the lever lift 10, thus increasing the force that linearly moves the lever lift 10. As a result, the motor 30 can be a small capacity motor even though it is needed to operate a comparatively large load of the clutch.

Figure 5:
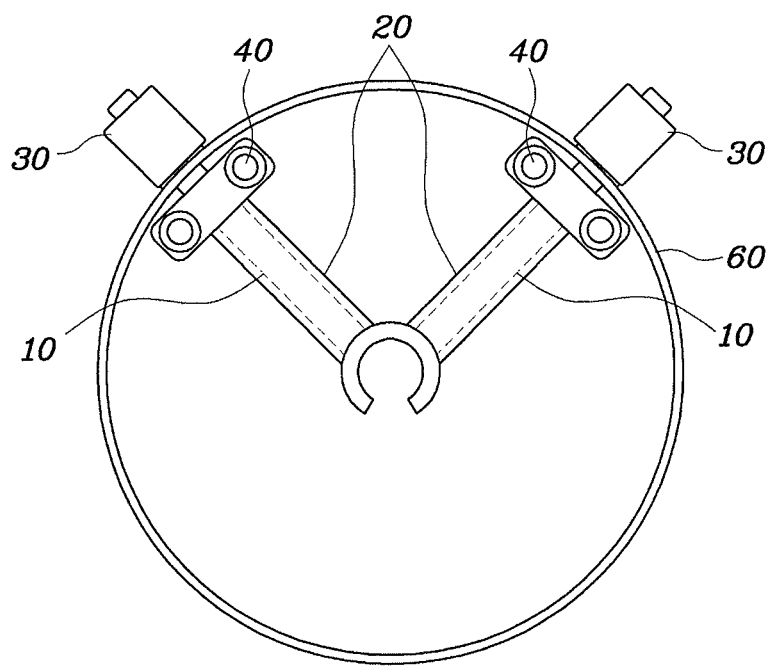
FIG. 5 is a view illustrating the structure of the clutch actuators of the present invention which are used in a double clutch.

FIG. 5 is a view illustrating the structure of the clutch actuators of the present invention which are used in a double clutch.

Referring to FIG. 5, the clutch actuators according to an exemplary embodiment of the present invention are provided in a clutch housing 60, wherein the clutch actuators are individually installed on respective clutches which are provided in the double clutch. That is, the two clutch actuators are installed together in the clutch housing 60 and are able to be used for a double clutch transmission (DCT). Furthermore, because the clutch actuators are installed in the clutch housing 60, the size and volume of the transmission can be reduced, thus enhancing the layout of the clutch actuator.

The operation of the present invention will be described with reference to FIGS. 2 and 3.

When the motor 30 is operated under the automatic electrical control of the TCU, the worm wheel 31 is rotated by the motor 30. Thereby, the worm which engages with the worm wheel 31 is linearly moved so that the lever lift 10 provided with the worm 11 is linearly moved.

Then, either of the inclined surfaces 12 that are provided on the lever lift 10 pushes the corresponding lift protrusion 22. The lift protrusions 22 slide along the corresponding inclined surfaces 12. At this time, the two lift protrusions 22 which are respectively provided on the first and second ends of the lever 20 move in the opposite directions.

In detail, when the lift protrusion 22 that is provided on the first end of the lever 20 moves towards the actuating member 50, the lift protrusion 22 that is provided on the second end of the lever 20 moves towards the worm wheel 31. Thus, the first end of the lever 20 pushes the actuating member 50. The diaphragm spring 52 is operated by the pushing of the actuating member 50, whereby the clutch enters the engaged state or released state.

As described above, the inclined surfaces 12 are provided on the lever lift 10, and the lift protrusions 22 that move along the inclined surfaces 12 are provided on the lever 20. Thus, when the lever lift 10 linearly moves in a predetermined direction, the lever 20 is operated in a seesaw manner, thus pushing the actuating member 50. As such, because the mechanism for operating the lever 20 is embodied by the operation mechanism that uses the inclined surfaces 12, the structure of the clutch actuator can be simplified, thus reducing not only the volume and weight of the overall apparatus but also the production cost.

Furthermore, in an exemplary embodiment of the present invention, the elastic member 40 which supports one surface of the second end of the lever 20 provides to the lever 20 force with which the lift protrusion 22 that is provided on the second end of the lever 20 pushes the corresponding inclined surface 12 of the lever lift 10. Thus, the lift protrusion 22 that is provided on the second end of the lever 20 makes contact with the corresponding inclined surface 12 and uses the elastic force of the elastic member 40 to linearly push the lever lift 10.

Therefore, the elastic force of the elastic member 40 is added to the torque of the motor 30 to linearly move the lever lift 10, thus increasing the force that linearly moves the lever lift 10. Thereby, a small capacity motor can be used as the motor 30 even though it must operate a comparatively large load of the clutch.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A clutch actuator apparatus for vehicles, comprising:
    a lever lift engaged to a power generation unit so that the lever lift is linearly moved by power generated from the power generation unit, wherein the lever lift includes an inclined surface provided on each of first and second ends thereof; and
    a lever provided between the lever lift and an actuating member that operates a diaphragm spring,
    wherein the lever includes lift protrusions formed at positions corresponding to respective inclined surfaces and contacting thereto, and
    wherein the lever is configured such that when the lever lift linearly moves in a predetermined direction, the lift protrusions move along corresponding inclined surfaces, so that opposite ends of the lever pivotally rotate, whereby one of the opposite ends of the lever moves towards the actuating member.

2. The clutch actuator apparatus as set forth in claim 1, wherein a worm wheel is coupled to the power generation unit so that the worm wheel is rotated by rotational force of the power generation unit, and
    wherein a worm is formed in the lever lift and engaged with the worm wheel, and
    wherein a rotating motion of the worm wheel generated by the power generation unit is converted into a linear motion of the worm, thus linearly moving the lever lift.

3. The clutch actuator apparatus as set forth in claim 1, wherein the power generation unit comprises a motor.

4. The clutch actuator apparatus as set forth in claim 1, wherein the inclined surfaces provided on the first and second ends of the lever lift are inclined in directions opposite to each other and the lift protrusions move along the corresponding inclined surfaces.

5. The clutch actuator apparatus as set forth in claim 1, wherein an elastic member is provided on an end of the lever that corresponds to the second end of the lever lift so that when the lever moves in a direction, the elastic member provides elastic force with which a lift protrusion provided on the end of the lever pushes corresponding inclined surface, thus assisting the lever lift moving linearly.

6. The clutch actuator apparatus as set forth in claim 5, wherein the actuating member is engaged to an end of the lever that corresponds to the first end of the lever lift.

7. The clutch actuator apparatus as set forth in claim 5, wherein the elastic member comprises a spring.

8. The clutch actuator apparatus as set forth in claim 1 comprising a plurality of clutch actuator apparatuses provided in a clutch housing,
    wherein the clutch actuator apparatuses are individually installed on respective clutches provided in a double clutch.

* * * * *